3,445,229
PHOTOPOLYMERIZABLE COMPOSITIONS,
ELEMENTS, AND PROCESSES
Vincent Joseph Webers, Red Bank, N.J., assignor to E. I. du Pont de Nemours and Company, Wilmington, Del., a corporation of Delaware
No Drawing. Filed May 17, 1965, Ser. No. 456,486
Int. Cl. G03c 1/68, 5/00
U.S. Cl. 96—28        9 Claims

ABSTRACT OF THE DISCLOSURE

A photopolymerizable composition comprising
(a) A film-forming thermoplastic organic polymer,
(b) An ethylenically unsaturated organic compound containing at least one terminal ethylenic group having a boiling point above 100° C. at atmospheric pressure, being capable of forming a high polymer by photoinitiated addition polymerization and having a plasticizing action on said thermoplastic organic polymer, and
(c) A monomolecular acid dye as a colorant in association with a basic nitrogen compound having a basicity, $K_b$, not less than $1 \times 10^{-5}$, a molecular weight from about 500 to about 100,000, an equivalent weight from about 40 to 800, and being present initially in the form of a salt with an acid selected from the group consisting of monocarboxylic acids of molecular weight less than 200, soluble half esters of dicarboxylic acids and strong mineral acids;

Constituents (a), (b) and the polymeric dye salt of constituent (c) being present in the respective amounts of 3 to 97, 97 to 3 and 0.1 to 10 parts by weight.

The compositions are useful as photopolymerizable layers and are useful for dry thermal image transfer process giving images free of background stain and of high contrast.

---

This invention relates to photopolymerizable compositions and elements embodying dyes, and to image reproduction processes utilizing the elements. More particularly this invention relates to a dry thermal process for transferring a dye-containing image from a photopolymerized element of the above compositions to a new receptor surface.

Various processes for producing copies of an image embodying thermal transfer are known. In one of the known processes, the thermal transfer is accomplished in a wet system or one in which a water-yielding system is present in addition to light-sensitive materials. In assignee's Burg and Cohen U.S. Patents 3,060,023; 3,060,-024; 3,060,025 and Heiart U.S. Patent 3,060,026, dry processes are described for forming images through photopolymerization. The processes comprise thermal transfer steps in transferring to a receptive surface thermoplastic photographic images from a stratum on a support, said stratum being solid below 40° C., and containing (1) Images areas (underexposed) which are thermally transferable by having a stick or transfer temperature above 40° C. and below 220° C., comprising
  (a) A thermoplastic organic polymer, and
  (b) An ethylenically unsaturated compound, preferably containing at least one terminal ethylenic group, having a boiling point above 100° C. at atmospheric pressure, being capable of forming a high polymer by photoinitiated addition polymerization and having plasticizing action on said thermoplastic polymeric compound; said constituents (a) and (b) being present in amounts from 3 to 97 and 97 to 3 parts by weight respectively, and (2) Complementary adjoining coplanar image areas (i.e., exposed reverse image areas) solid at 50° C. and comprising an addition polymer of the aforesaid monomer and said thermoplastic polymeric compound. Said stratum also contains (c) An addition polymerization initiator activatable by light and thermally inactive below 185° C. in an amount from 0.001 to 10.0 parts by weight per 100 parts by weight of components (a) and (b), and, if desired, (d) An addition polymerization inhibitor in an amount from 0.001 part to 2.0 parts by weight per 100 parts by weight of the components (a) and (b) and, in order to form a visible image, and/or (e) A colorant, e.g., a dye or a color forming compound, e.g., a color former capable of forming an azomethine or quinoneimine dye. Preferably the photopolymerizable stratum also bears at least one protective cover stratum of a wax as described in assignee's Burg U.S. Ser. No. 234,214 filed Oct. 30, 1962, now Patent No. 3,203,805, or a cover sheet as disclosed in Heiart U.S. 3,060,026.

The dyes suggested in the above patents are of the monomolecular type as distinguished from polymeric dyes.

The processes for copying or transferring an image of the foregoing patents, however, have some disadvantages. Monomolecular dyes have a strong tendency to aggregate and crystallize thus causing high density spots surrounded by areas of low density. It has also been observed that the monomolecular dye in the exposed areas tends to transfer to the receptive sheet during transfer of the unexposed non-polymerized areas.

This decreases the contrast of the desired image by virtue of the fact that the background area becomes stained. It is believed that dye transfers from exposed areas because it is exuded from the polymer image in these areas even though the polymer image and filler in such areas does not transfer. This can also hold true for some finely ground pigments. The use of pigments as colorants, however, is objectionable for a number of other reasons, one of which is that they scatter light, thus reducing the resolution of the images. Pigments in general are not usually as brilliant as soluble dyes and they require the presence of surface active agents to effect dispersion thus making for a more complicated system. Long milling and dispersing times are required to obtain satisfactory mixtures of binder, monomer and pigment.

In an attempt to overcome the disadvantages of stain due to exudation it was suggested in assignee's Seide, U.S. Ser. No. 340,491, filed Jan. 27, 1964 (U.S. Patent 3,376,136, Apr. 12, 1968), to use as the colorant or color-yielding compound, component (e), a light-fast polymeric dye in an amount from 0.5 to 70 parts by weight per 100 parts by weight of components (a) and (b). The light-fast polymeric dyes, having a molecular weight of at least 10,000 are made by reacting certain monomolecular dyes with polymers having in recurring units of the polymer, reactive groups, e.g., —OH, —NH₂, and >NH. The monomolecular dyes are represented by the formula: F—Y where F is a dye moiety containing light-absorbing units and preferably having an extinction coefficient, ε, greater than 1000. Y represents a group which will react with the recurring reactive group of the polymer to form the polymeric dye.

Although the polymeric dyes produce little or no stain when used in elements for the thermal processes of the above patents and also improve the sensitometric characteristics of said elements the polymeric dyes do have some drawbacks. Dyes having the necessary special groups for reacting with the polymer and at the same time being not readily reactive with themselves are expensive and it is necessary to form the polymeric dye first by a separate reaction before incorporating it in the photopolymerizable system. The reaction for producing the polymeric dye involves large quantities of solvent and complicated procedures.

It is, therefore, an object of this invention to provide improved photopolymerizable compositions and elements useful in thermal transfer processes of image reproduction as disclosed in the above patents. It is another object to provide a simple and relatively inexpensive method of providing photopolymerizable elements in which the colorants do not exude from the polymerized areas of the photopolymerizable layer. A further object is to provide a dry, thermal process of image reproduction which provides images virtually free of background stain and having high contrast. A still further object is to provide photopolymerizable elements containing colorants having little or no tendency to aggregate or crystallize. Still further objects will be apparent from the following description of the invention.

The above objects are accomplished by using in the above-described photopolymerizable compositions a monomolecular acid dye as the colorant (e) in association with a basic nitrogen compound having a molecular weight of at least 500 or about 500 to 100,000, a basicity, $K_b$, not less than $1 \times 10^{-5}$ and an equivalent weight from about 40 to 800, and initially present in the form of the salt with a monocarboxylic acid, a half ester of a dicarboxylic acid or a strong mineral acid. Photopolymerizable elements having a layer embodying the above compositions showed substantially little or no background stain from exposed areas following exposure and thermal transfer as compared to similar compositions from which the basic nitrogen acid salt compound was omitted.

An exemplary procedure involves adding, for example, polyethyleneimine-acetic acid salt in an amount of two equivalents of ethyleneimine units per equivalent of acid dye in the photopolymerizable composition. The base strength of the imine is not constant and depends on the degree of neutralization, thus, in the case of polyethyleneimine, the neutral salt has the above ratio. Where organic solvent-soluble photopolymerizable systems are used, salts of organic solvent soluble carboxylic acids, e.g., formic, acetic, propionic, chloroacetic and benzoic acids, or organic solvent soluble half esters of dicarboxylic acids, e.g., methoxypolyethylene oxide hydrogen succinate, with a polymeric aliphatic nitrogen base may be used, provided that the molecular weight of the polymeric aliphatic nitrogen base is high enough, so that the acid dye/organic nitrogen base/acid salt combination will be sufficiently immobile and provided that this combination does not interfere with polymerization or strongly absorb actinic light. Of course, it is also a requirement that said combination be soluble in the coating solution of the photopolymerizable composition.

In organic solvent systems, simple aliphatic acids having 1-8 carbon atoms are most suitable. Where water-soluble photopolymerizable compositions are used, mineral acids and organic sulfonic acids may be used instead of the formic, acetic, propionic, butyric, valeric, caproic, heptoic and caprylic acids.

The use of half esters containing a polyethylene oxide radical has the added advantage of acting as a chain-transfer agent in the manner taught by Barney et al., U.S. Patent 3,046,127. This of course has the effect of increasing the photographic speed. The solubility of the nitrogen base polymer is increased by the presence of the polyethylene oxide radical.

Suitable polymeric aliphatic nitrogen bases include primary, secondary and tertiary amines and to insure immobility they should have a molecular weight from about 500 to about 100,000. In addition to polyethyleneimine, a polymer having the structure:

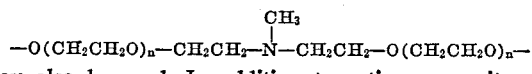

may also be used. In addition to acting as a nitrogen base, this polymer can also act in the role of a chain-transfer agent as described above and also has increased solubility.

The polymeric dye salt that is formed by an interchange reaction is present in the photopolymerizable layers in an amount from .001 to .10 parts, by weight.

The equivalent weight of the nitrogen base, that is the weight necessary to ionically combine with a one mole of dye should be below 800, and preferably less than 200, in the absence of polyethylene oxide radicals. The base strength, $K_b$, should be $1 \times 10^{-5}$ or more. Polyethylenediamines and polyethylene amines are representative of useful bases. Suitable acid dyes include any acid dye capable of forming an ionic bond with a nitrogen base.

The thermal transfer process comprises pressing the surface of an exposed element containing the photopolymerizable layer having initially incorporated therein a monomolecular acid dye and a low molecular weight carboxylic acid or dicarboxylic half ester acid salt of a basic nitrogen compound having a molecular weight of at least 500, a basicity of not less than $1 \times 10^{-5}$, and an equivalent weight of 40 to 800; and containing polymerized image areas and coplanar underexposed complementary reverse image areas into surface contact with the image-receptive surface of a separate element, heating at least one of said elements to a temperature of at least 40° C., separating the two elements whereby the thermally transferable, underexposed, dye-containing image areas of said stratum transfer to said image-receptive element and the overexposed, dye-containing, polymerized areas do not transfer or stain the background areas of the image-receptive element.

The term "underexposed" is intended to mean the image areas which are completely unexposed or partially exposed, so that there is a material amount of the addition polymerizable compound still present and insufficient addition polymer image has been formed to bind the constituents. In this polymer image, the image areas do not melt and transfer to an image-receptive element. The term, "transfer temperature" means the temperature at which the image areas in question stick and adhere, within 10 seconds, under slight pressure, e.g., thumb pressure, to analytical filter paper (Schleicher & Schuell analytical paper #595).

In general, the essential components (a) and (b) of the photopolymerizable composition are present in amounts from 3 parts to 97 parts and 97 parts to 3 parts by weight, respectively, based on the weight of polymer and monomer. Also, the compositions are such that they do not melt at temperatures below 40° C.

The foregoing thermoplastic image-bearing elements can be made by exposing to actinic light, imagewise, a layer having the constitution defined above for thermally transferable image areas of item (1) above until sufficient addition polymerization takes place in the exposed areas to raise the transfer temperature at least 10° C. above that of the unexposed areas. The exposure can be through a stencil, line or halftone negative or positive, a cutout stencil in contact with the layer or by reflectographic or projection exposure.

While the addition polymerizable component present in the underexposed areas of the photopolymerizable element can be a monomeric ethylenically unsaturated compound capable of polymerizing or forming a high polymer in a short time, e.g., 0.5–10 seconds, by photoinitiated polymerization as disclosed in Plambeck, U.S. Patent 2,760,863, the particularly useful compounds fall within a general class, namely normally non-gaseous (normal boiling point above 100° C. at atmospheric pressure) ethylenically unsaturated monomeric compound having one to five terminal ethylenic groups, preferably at least two, a normal boiling point above 100° C. and a plasticizing action on the thermoplastic layer.

In practicing the invention, a photopolymerizable element containing an acid dye and a low molecular weight carboxylic acid or dicarboxylic acid half ester acid salt of a basic nitrogen compound having a molecular weight of at least 500 as described above and containing an image-yielding stratum of the above components and, optionally, a wax cover layer is exposed to actinic radiation through a photographic process transparency, e.g., a photographic negative, positive, two tone, or halftone, a light transmitting paper, or to an image or printed matter on an opaque support by means of reflex exposure, and is intimately brought into contact under pressure with a receptor support, e.g., paper, metal, synthetic polymer, screen, etc., during which time the element is heated in a range of 40° to 220° C. or more, and while still warm the surfaces are separated. The thermoplastic photopolymerizable composition is transferred, to paper, metal, etc., support in the areas corresponding to the unexposed, or least exposed areas to give at least one duplicate copy of the original image and with a negative image remaining on the original support. In this case a sharp negative image can be obtained by solvent washing the element to remove any unexposed material. Multiple copies can be obtained by repeating the heat transfer procedure using appropriate coating thicknesses of the photopolymerizable layer, pressures and temperatures to give the desired number of copies. The process can be used to prepare a silk screen. In the silk screen embodiment, the thickness of the layer will depend on the nature of the screen, e.g., a coarser screen requires a heavier coating.

Relief images ranging in depth from less than .001 inch up to .001 inch or more can be formed by the instant process, but unlike the processes described in Plambeck, U.S. Patent 2,760,863, a relief image is formed by thermal transfer of the unexposed areas of the photopolymerizable stratum and not by solvent washout of said unexposed areas.

Prior to the transfer of a portion of the photopolymerizable layer (in underexposed areas), the layer is exposed to actinic radiation. This may be through a two-tone image or a process transparency, e.g., a process negative or positive (an image-bearing transparency consisting solely of substantially opaque and substantially transparent areas where the opaque areas are substantially of the same optical density, the so-called line or halftone negative or positive). The image or transparency may or may not be in operative contact, e.g., contact exposure or projection exposure. It is possible to expose through paper or other light transmitting materials; a stronger light source or longer exposure times must be used, however.

Reflex exposure techniques are especially useful in the present invention, particularly when office copies are made. By using reflex exposure, copies can be made from opaque supports, e.g., paper, cardboard, metal, etc., as well as from poor light transmitting surfaces with no loss in speed, excellent resolution, and in addition, right reading copies are obtained directly on transfer. Also the copies obtained are substantially free of background stain.

Since free-radical generating addition-polymerization initiators depend on light for their activation, it s possible to use a wide range of light sources. Such sources include carbon arcs, mercury-vapor arcs, fluorescent lamps, argon glow lamps, electronic flash units and photographic flood lamps. Of these, the mercury-vapor arcs, particularly the sunlamp type, the fluorescent sunlamps, are most suitable.

After exposure of the photopolymerizable layer, the exposed composition is contacted with the receptor support while simultaneously heat is applied to effect the transfer of the underexposed areas of the photopolymerizable composition. While the heat is preferably applied simultaneously with the contact of the exposed element to the receptor support, the heat can be applied at any stage of the process prior to the separation step to either or both elements provided the transfer temperatures correspond to at least the softening temperature of the photopolymerizable stratum. Heat can be applied by mans well known to the art, e.g., rollers, flat or curved heating surfaces or platens, radiant sources, e.g., heating lamps, etc.

The heating temperature can range from above 40° C. to about 220° C. and the contact time for 0.1 to 10 seconds. In general about 0.1 second is adequate and shorter periods of contact are possible by using an intense radiant source of heat, e.g., infrared lamps or heat sources. Preferably the temperature range is from 55° C. to 120° C.

This invention will be further illustrated by but is not intended to be limited to the following detailed examples.

EXAMPLE 1

To 20.0 grams of a 16.6% aqueous solution of polyethyleneimine (molecular weight 30,000–40,000—purchased from Chemirad Corporation, East Brunswick, N.J.) there was added 4.8 grams of glacial acetic acid to give a solution of polyethyleneimine acetate. A stock solution was made of the following ingredients, using gentle heating to effect solution.

| | Grams |
|---|---|
| Methanol (45 ml.) | 35.7 |
| Pontacyl Wool Blue CI Acid Blue 59 | 1.125 |
| Polyethylene glycol (M.W. 4000) | 1.5 |
| Pentaerythritol triacrylate (94% active) | 50.9 |

The above solution was combined with a solution of polymeric binder and photoinitiator prepared as follows:

| | Grams |
|---|---|
| Cellulose acetate butyrate ca. 20.5% acetyl, ca. 26% butyryl groups and having a viscosity of 56 to 131 poises as determined by ASTM Method D-1343-54T in a solution described in Formula A, ASTM Method D-871-54T | 11.25 |
| Cellulose acetate containing 39.4% acetyl groups and having a viscosity of 147-187 poises as determined by ASTM Method D-1343-56 in the solution described as Formula A, ASTM Method D-871-56 | 9.00 |
| Phenanthrenequinone | 0.6 |
| Acetone | 175.0 |

To three 19.0 gram portions of the combined solution there were added respectively (A) 0.2 ml. of polyethyleneimine acetate solution and 1.05 ml. of alcohol; (B) 0.1 ml. of polyethyleneimine acetate solution and 1.15 ml. of alcohol; and (C) 1.25 ml. of alcohol.

The three solutions were coated on a support to a wet thickness of .006 inch and dried at room temperature in the dark. Part of each coating was laminated with a sheet of .001-inch thick polyethylene terephthalate film as described in the above Heiart, U.S. Patent 3,060,026 and the remainder of the coating was overcoated with a thin (about 0.1 mil) wax coating as described in assignee's Burg Application U.S. Ser. No. 234,214 filed Oct. 30, 1962.

Samples of the coated film were exposed directly through a $$\sqrt[6]{2}$$

step wedge and thermally transferred as described above onto a paper support, the laminated sheets being stripped off before transfer. A curve was plotted of transferred density against step number. The background stain was taken as the density transferred at an exposure $$4.4 \sqrt[6]{2}$$

steps beyond the first step giving top density. This 4.4 step corresponds with the differential reflex exposure received from the paper and from black ink.

Of the samples containing the wax overcoatings control coating (C) gave background density of .068, while coatings (A) and (B) gave background densities of .035 and .048 respectively. In comparing the laminated coatings, control coating (C) showed background stain density of .04, while the polyethyleneimine containing coatings showed background densities of .018 and .022 respectively. Samples of the coatings were stored in an oven at 50° C. to secure accelerated aging. After five days, there was extensive dye crystallization of the dyes in the two controls (C) which was readily evident as pale patches in the dark blue coating, while 15 days aging of the polyethyleneimine containing coatings gave evidence of only slight dye crystallization.

EXAMPLE II

A solution was made from 11.2 grams of Pontacyl Wool Blue BL (C.I. 50315), 14.9 grams of polyethylene glycol (M.W. 1000) and 600 grams of methanol. To 546 grams of this solution there was added a solution containing 5.3 grams of phenanthrenequinone, 1620 grams of methyl acetate and 530 grams of pentaerythritol triacrylate. To the above mixture there was added 340 grams of a solution containing 24 grams of the cellulose acetate butyrate defined in Example I, 19 grams of the cellulose acetate defined in Example I, 60 grams of methanol and 277 grams of methyl acetate.

To one portion (A) of the above mixture weighing 662 grams there was added a solution of 20 grams of methanol and 55.0 grams of methyl acetate. To a second 662 gram portion (B) there was added a solution made from 24 grams of methanol, 36.0 grams of methyl acetate and 14.55 grams of a solution of polyethyleneimine formate made from 3.01 grams of 50% aqueous polyethyleneimine, 0.84 grams of 85% formic acid and methanol to 14.55 grams. These two (A) and (B) portions were coated to give a dried thickness of 0.0004 inch on 0.001 inch polyethylene terephthalate film and then overcoated with a wax as described in Example I. Upon exposure and thermal transfer and testing as described in Example I it was found that the background density of (A) containing no nitrogen base/formic acid salt was .075. The background density of (B) containing the formic acid salt of polyethyleneimine was only .04.

EXAMPLE III

A photopolymerizable composition was made as follows:

|  | Grams |
|---|---|
| Pentaerythritol triacrylate | 59.80 |
| Cellulose acetate butyrate (Example I) | 16.78 |
| Cellulose acetate (Example I) | 11.72 |
| Phenanthrenequinone | 1.00 |
| Methoxypolyethylene glycol (M.W. 750) hydrogen succinate | 4.67 |
| Pontacyl Wool Blue [1] | 1.27 |
| Polyethyleneimine | 0.75 |
| Castorwax | 4.01 |
| Solvent—2:1 mixture of methylene chloride and methyl cellosolve to make an 8.8% solution of the cellulosic binders. | |

[1] 500 grams of Pontacyl Wool Blue (Example 1) was dissolved in a solution of 1400 ml. of isopropyl alcohol, 750 ml. of concentrated hydrochloric acid at 75° C. The acid form of the dye precipitated by adding 1400 ml. of distilled water and allowing the mixture to cool. The dye was filtered and dried. The neutral equivalent of the dye was 720, indicating 90% of the dye was in the acid form. (Theoretical neutral equivalent for 100% conversion is 648.) A solution of 1.50 mg. in 100 ml. of isopropyl alcohol had an absorption maximum of 588 mμ with an optical density of 1.305.

The solution was coated to give a dry thickness of 0.004 inch on oriented polypropylene film and then overcoated with a wax as described in Example I. Upon exposure, thermal transfer and testing as described in Example I the background stain gave a density of only .02 as compared to (C), the control of Example I which was .068.

EXAMPLE IV

A photopolymerizable composition was made as follows:

|  | Grams |
|---|---|
| Pentaerythritol triacrylate | 200.0 |
| Methylene chloride | 700.0 |
| Methyl cellosolve | 135.0 |
| Cellulose acetate butyrate (Example I) | 40.0 |
| Cellulose acetate (Example I) | 27.5 |
| Dye solution [1] | 98.0 |
| Phenanthrenequinone | 2.0 |
| Nitrogenous polymer base solution | 123.0 |
| Total with $CH_2Cl_2$ | 2130.0 |

[1] Dye solution: 4 grams of Pontacyl Wool BL; 100 grams of methyl cellosolve.

A 10.7% solution in monomethyl ether of ethylene glycol of the polyamine hydrophilic cationic polymer described in Example I of Webers U.S. 3,118,784 containing 1.48% acetic acid.

Samples of the above composition coated in the manner described in Example I exhibited substantially the same sensitometric properties with no indication of background stain or dye aggregation.

Among the additional acid dyes which could be used as colorants in associations with the basic nitrogen compound are:

Anthracene Yellow GR (400% pure Schultz No. 177)
Fast Red S Conc. (Colour Index 176)
Pontacyl Green SN Ex. (Colour Index 737)
Acid blue black (Colour Index 246)
Acid Magenta O (Colour Index 692)
Naphthol Green B Conc. (Colour Index 5)
Brilliant Paper Yellow Ex. Conc. 125% (Colour Index 364)
Tartrazine (Colour Index 640)
Metanil Yellow Conc. (Colour Index 138)
Pontacyl Scarlet R Conc. (Colour Index 487)
Pontacyl Rubine R Ex. Conc. (Colour Index 179)

All acid dyes generally are sold commercially as sodium salts. They have varying numbers of sulfonic acid groups, however, one sulfonate group is sufficient to ionically attach the dye to the nitrogenous base. However, two or more such groups give dyes of even further decreased mobility in the system.

It is preferable to use the acid form of the acid dye with the free base or partially neutralized nitrogenous base, but the sodium salts may be used with a nitrogenous base that has been completely neutralized.

Suitable thermoplastic polymers for use as component (a) include:

(A) Copolyesters, e.g., those prepared from the reaction product of a polymethylene glycol of the formula $HO(CH_2)_nOH$, wherein $n$ is a whole number 2 to 10 inclusive, and (1) hexahydroterephthalic acid, sebacic and terephthalic acids, (2) terephthalic, isophthalic and sebacic acids, (3) terephthalic and sebacic acids, (4) terephthalic and isophthalic acids, and (5) mixtures of copolyesters prepared from said glycols and (i) terephthalic, isophthalic and sebacic and adipic acids;

(B) Polyamides, e.g. N-methoxymethyl polyhexamethylene adipamide;

(C) Vinylidene chloride copolymers, e.g., vinylidene chloride/acrylonitrile, vinylidene chloride/methyl acrylate and vinylidene chloride/vinyl acetate copolymers;

(D) Ethylene/vinyl acetate copolymers;

(E) Cellulosic ethers, e.g., methyl cellulose, ethyl cellulose and benzyl cellulose;

(F) Cellulose esters, e.g., cellulose acetate, cellulose acetate succinate and cellulose acetate butyrate;

(G) Polyvinyl esters, e.g., polyvinyl acetate/acrylate, polyvinyl acetate/methacrylate and polyvinyl acetate;

(H) Polyacrylate and alpha-alkyl polyacrylate esters, e.g., polymethyl methacrylate and polyethyl methacrylate;

(I) High molecular weight polyethylene oxides of polyglycols having average molecular weights from about 4000 to 1,000,000;

(J) Polyvinyl chloride and copolymers, e.g., polyvinyl chloride/acetate;

(K) Polyvinyl acetal, e.g., polyvinyl butyral, polyvinyl formal;

(L) Polyformaldehydes;

(M) Polyurethanes;

(N) Polystyrenes.

To the thermoplastic polymer constituent of the photopolymerizable composition there can be added nonthermoplastic polymeric materials to give certain desirable characteristics, e.g., to improve adhesion to the base support, adhesion to the receptor support on transfer, wear properties, chemical inertness, etc. Suitable nonthermoplastic polymeric compounds include polyvinyl alcohol, cellulose, anhydrous gelatin, phenolic resins and melamine formaldehyde resins, etc. If desired, the photopolymerizable layers can also contain immiscible polymeric or non-polymeric organic or inorganic fillers or reinforcing agents which are essentially transparent at the wave lengths used for the exposure of the photopolymerizable material, e.g., the organophilic silica, bentonites, silica, powdered glass, in amounts varying with the desired properties of the photopolymerizable layer. The fillers are useful in improving the strength of the composition and reducing tack.

Suitable addition polymerizable ethylenically unsaturated compounds for use as components (b) which can be used with the above-described thermoplastic polymer compounds include in addition to the pentaerythritol triacrylate of the examples, other pentaerythritol derivatives as disclosed in assignee's Celeste et al. U.S. Appln. Ser. No. 274,909, filed April 23, 1963 (U.S.P. 3,261,686, July 19, 1966), unsaturated esters of polyols, particularly such esters of the alpha-methylene carboxylic acids, e.g., ethylene glycol diacrylate, diethylene glycol diacrylate, glycerol diacrylate, glycerol triacrylate, ethylene glycol dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tetramethacrylate, 1,3-propanediol diacrylate, 1,5-pentanediol dimethacrylate, and the bis-acrylates and methacrylates of polyethylene glycols of molecular weight 200–500, and the like, unsaturated amides, particularly those of the alpha-methylene carboxylic acids, and especially those of the alpha-omega diamines and oxygen-inherited omega-diamines, such as methylene bis-methacrylamide, 1,6-hexamethylene bis-acrylamide, diethylene triamine tris-methacrylamide, bis-(gamma-methacrylamidopropoxy) ethane, beta-methacrylamido, ethyl methacrylate, N-(beta-hydroxyethyl)-beta-(methacrylamido) ethyl acrylate and N,N-bis(beta-methacryloyloxyethyl) acrylamide; vinyl esters such as divinyl succinate, divinyl adipate, divinyl phthalate, divinyl terephthalate, divinyl benzene-1,3-disulfonate, and divinyl butane-1,4-disulfonate; and unsaturated aldehydes, such as sorbaldehyde (hexadienal). An outstanding class of these preferred addition polymerizable components are the esters and amides of alpha-methylene carboxylic acids and substituted carboxylic acids with polyols and polyamines wherein the molecular chain between the hydroxyls and amino groups is solely carbon or oxygen-interrupted carbon. The preferred monomeric compounds are multifunctional, but monofunctional monomers can also be used. The amount of monomer added varies with the particular thermoplastic polymer used.

The photopolymerizable compositions of assignee's Schoenthaler Appln. Ser. No. 451,300 filed Apr. 27, 1965, can be used in place of the (a) and (b) components listed above.

A preferred class of addition polymerization initiators (c) activatable by actinic light and thermally inactive at and below 185° C. includes the substituted or unsubstituted polynuclear quinones which are compounds having two intracyclic carbonyl groups attached to intracyclic carbon atoms in a conjugated six membered carbocyclic ring, there being at least one aromatic carbocyclic ring fused to the ring containing the carbonyl groups. Suitable such initiators include 9,10-anthraquinone, 1-chloroanthraquinone, 2-chloroanthraquinone, 2-methylanthraquinone, 2 - tert - butylanthraquinone, octamethylanthraquinone, 1,4 - naphthaquinone, 9,10 - phenanthrenequinone, 1,2 - benzanthraquinone, 2,3 - benzanthraquinone, 2-methyl - 1,4 - naphthaquinone, 2,3 - dichloronaphthoquinone, 1,4 - dimethylanthraquinone, 2,3 - dimethylanthraquinone, 2 - phenylanthraquinone, 2,3 - diphenylanthraquinone, sodium salt of anthraquinone alpha-sulfonic acid, 3-chloro-2-methylanthraquinone, retene quinone, 7,8,9,10 - tetrahydronaphthacenequinone, and 1,2,3,4-tetrahydrobenzene (a) anthracene-7,12-dione. Other photoinitiators which are also useful are described in Plambeck U.S. Patent 2,760,863 and include vicinal ketaldonyl compounds, such as diacetyl, benzil, etc.; α-ketaldonyl alcohols, such as benzoin, pivaloin, etc.; acyloin ethers, e.g., benzoin methyl and ethyl ethers, etc.; α-hydrocarbon substituted aromatic acyloins, including α-methylbenzoin, α-allylbenzoin, and α-phenylbenzoin. In addition, the photoreducible dyes and reducing agents disclosed in Oster, U.S. Patents 2,850,445; 2,875,047; 3,097,096; and Oster et al. U.S. 3,074,794; 3,097,097; and 3,145,104 may also be used for this purpose. In addition dyes of the phenazine, oxazine, and quinone classes may be used.

Suitable thermal polymerization inhibitors (d) can be used if desired, e.g., p-methoxyphenol, hydroquinone, alkyl- and aryl-substituted hydroquinones and quinones, tert-butyl catechol, pyrrogallol, copper resinate, naphthylamines, beta-naphthol, cuprous chloride, 2.6-di-tert-butyl p-cresol, phenothiazine, pyridine, nitrobenzene, dinitrobenzene, p-toluquinone and chloranil.

In addition to the low molecular weight carboxylic acid and dicarboxylic half-ester acid salts of polyethyleneimine, other similar nitrogen base compounds may be used. Also, amino compounds such as dimethyl aminoethyl methacrylate, diethylaminoethyl methacrylate and those resulting from the reductive amination of ethylene/carbon monoxide copolymers may be used. It is preferred to use secondary and tertiary amines instead of primary amines where vicinal quinones such as phenanthrenequinone are used as the photoinitiators. For example the carboxylic acid and half-ester dicarboxylic acid salts of the polyamines disclosed in Belgium Patents 554,506 and 560,446 may be used. In addition to the acids disclosed above, butyric, methoxy acetic acids and dicarboxylic acids in the form of half esters with polyoxy ethylene glycols of molecular weights from 300 to 700 may also be used.

The photopolymerizable composition containing the low molecular weight carboxylic acid salts and dicarboxylic half-esters acid salts of polymeric aliphatic nitrogen bases may be coated on any suitable support. Suitable materials must be stable at the heating temperatures used in the above described thermal transfer process. Suitable bases or supports include in addition to the polyethylene terephthalate and polypropylene of the examples, those disclosed in U.S. Patent 2,760,863, glass, wood, paper, cloth, cellulose esters, e.g., cellulose acetate, cellulose propionate, cellulose butyrate, etc., other polyolefins and other plastic compositions, etc. The support may have in or on its surface and beneath the photopolymerizable stratum an antihalation layer as disclosed in said patent or other substrata needed to facilitate anchorage to the base and also coatings on the back of the support.

The receptor support to which the image is transferred must also be stable at the process temperatures. The particular support used is dependent on the desired use for the transferred image and on the adhesion of the image to the base. Suitable receptors, in addition to bond paper, may be resin and clay sized paper, resin coated or impregnated paper, cardboard, metal sheets, foils, and meshes, e.g., aluminum, copper, steel, bronze, etc.; wood, glass, nylon, rubber, polyethylene, linear condensation polymers such as the polyesters, e.g., polyethylene terephthalate, regenerated cellulose, cellulose esters, e.g., cellulose acetate, silk, cotton, and viscose rayon fabrics or screens.

As previously mentioned, the receptive support may have a hydrophilic surface or may contain on its surface chemical compounds which react with compounds being transferred so as to produce differences in color, hydrophilicity or conductivity between the exposed and underexposed or unexposed areas or for improved adhesion or brightening of the receptor support. The receptor surface may be smooth, contain roughening agents such as silica, be perforated or be in the form of a mesh or screen.

The elements of the present invention are useful for a variety of copying, printing, decorative and manufacturing operations. It will be readily understood that as a result of the exposure and transfer operations described in the examples, the operator forms simultaneously a positive copy of the original image on the receptor sheet and a negative copy on the original support, both of which are quite useful in photomechanical printing operations. Where the reversed image on the original support is to be utilized, any of the non-transferred unpolymerized material can be completely removed by a liquid which is a solvent for the unpolymerized but not for the polymerized material which was affected by actinic radiation. This leaves a highly colored, reversed copy of the original which is free of background stain. Multicopies of the duplicate copy can also be made which are free of background stain by bringing into intimate contact the surface of the exposed photopolymerizable element and the surface of the receptor sheet and applying heat. The heat transfer method is useful in making office copy and also for decorative effects. It is also useful in making photoresistors and silk screens. A further application is in the preparation of multicolor prints which can be made by virtue of the fact that different colored mononuclear acid dyes may be used with the acid salts of the polymeric nitrogen bases. The acid dye/acid salt base combinations may be incorporated into the photopolymerizable system either as the ionic combination or separately during the compounding of the photopolymerizable composition. When differently colored images are transferred in succession, colored images may be formed which have a minimum of background stain and have good fade-resistant qualities.

The instant invention has the advantage that by an inexpensive, quick and simple procedure the dry, thermal transfer image reproduction processes of the above Burg & Cohen and Heiart patents can be carried out producing good clear high quality images free of unwanted background stain and having high contrast and fidelity. The invention also has the advantage of eliminating the undesirable long "toe" of the sensitometric response curve. The absence of a low-contrast "toe" region means that high contrast copies can be obtained from low contrast originals. Still other advantages will be apparent to those skilled in the art from the foregoing description.

I claim:
1. A photopolymerizable composition comprising
   (a) a film-forming thermoplastic organic polymer,
   (b) an ethylenically unsaturated organic compound containing at least one terminal ethylenic group having a boiling point above 100° C. at atmospheric pressure, being capable of forming a high polymer by photoinitiated addition polymerization and having a plasticizing action on said thermoplastic organic polymer, and
   (c) a monomolecular acid dye as a colorant in association with a basic nitrogen compound having a basicity, $K_b$, not less than $1 \times 10^{-5}$, a molecular weight from about 500 to about 100,000, an equivalent weight from about 40 to 800, and being present initially in the form of a salt with an acid selected from the group consisting of monocarboxylic acids of molecular weight less than 200, soluble half esters of dicarboxylic acids and strong mineral acids; and
   (d) an addition polymerization initiator;
constituents (a), (b) and the polymeric dye salt of constituent (c) being present in the respective amounts of 3 to 97, 97 to 3 and 0.1 to 10 parts by weight.

2. A composition according to claim 1 wherein said basic nitrogen compound is a polyethyleneamine.

3. A composition according to claim 1 wherein said basic nitrogen compound is a polyethyleneimine.

4. A photopolymerizable element comprising a support bearing an image-forming layer of a photopolymerizable composition comprising
   (a) a film-forming thermoplastic organic polymer,
   (b) an ethylenically unsaturated organic compound containing at least one terminal ethylenic group, having a boiling point above 100° C. at atmospheric pressure, being capable of forming a high polymer by photoinitiated addition polymerization and having a plasticizing action on said thermoplastic organic polymer, and
   (c) a monomolecular acid dye as a colorant in association with a basic nitrogen compound having a basicity, $K_b$, not less than $1 \times 10^{-5}$, a molecular weight from about 500 to 100,000, an equivalent weight from about 40 to 800, and being present initially in the form of a salt with an acid selected from the group consisting of monocarboxylic acids of molecular weight less than 200, soluble half esters of dicarboxylic acids and strong mineral acids; and
   (d) an addition polymerization initiator;
constituents (a), (b) and the polymeric dye salt of constituent (c) being present in the respective amounts of 3 to 97, 97 to 3 and 0.10 to 10 parts by weight.

5. An element according to claim 4 wherein said basic nitrogen compound is a polyethyleneamine.

6. An element according to claim 4 wherein said basic nitrogen compound is a polyethylenemine.

7. A thermal image-transfer process which comprises
   (1) pressing the surface of an exposed element having a layer as defined in claim 4 containing polymerized image areas and coplanar unexposed complementary reverse image areas into surface contact with the image-receptive surface of a separate element,
   (2) heating at least one of said elements to a temperature of at least 40° C. to render the underexposed surface areas of the layer tacky and separating the two elements whereby the underexposed areas transfer to said receptive element and the overexposed layers do not transfer.

8. A process according to claim 7 wherein said basic nitrogen compound is a polyethyleneamine.

9. A process according to claim 7 wherein said basic nitrogen compound is a polyethyleneimine.

References Cited

UNITED STATES PATENTS

| 3,060,023 | 10/1962 | Burg et al. | 96—115 XR |
| 3,376,136 | 4/1968 | Seide | 96—115 XR |
| 3,252,966 | 5/1966 | De Winter | 96—115 XR |

OTHER REFERENCES

Wahl, O., et al., "Process for Diffusion-Resistant Intercalation of Soluble Compounds Into Hydrophilic Layers and Films," German patent application 576,8/02F 6151, April 30, 1951.

J. TRAVIS BROWN, Primary Examiner.

RONALD H. SMITH, Assistant Examiner.

U.S. Cl. X.R.

96—35.1, 115